Jan. 30, 1968 W. R. DUNN 3,366,140
CONTROL APPARATUS INCLUDING BIMETAL ACTUATOR
WITH TEMPERATURE COMPENSATOR
Filed March 3, 1966

INVENTOR.
WILLIAM R. DUNN
BY *Donald R. Fostrom*
ATTORNEY

United States Patent Office

3,366,140
Patented Jan. 30, 1968

3,366,140
CONTROL APPARATUS INCLUDING BIMETAL ACTUATOR WITH TEMPERATURE COMPENSATOR
William R. Dunn, Los Angeles, Calif., assignor to Honeywell Inc., Minneapolis, Minn., a corporation of Delaware
Filed Mar. 3, 1966, Ser. No. 531,500
10 Claims. (Cl. 137—596.17)

This invention relates to control apparatus and more specifically to a condition responsive operator for a control device such as a valve or switch.

The invention provides an improved operator for a control device of the type having two control members, such as valve nozzles, and a cooperating member movable for operable engagement therewith and wherein either one or the other of the control members is operably engaged by the cooperating member at all times. Thus, the device is constructed so that as the operator moves from one control position to another, there is an overlap in the engagement of the member with two control members. In addition, the structure providing this function is extremely simple and relatively inexpensive to manufacture and, in the preferred embodiment, provides ambient temperature compensation.

My invention provides an actuator which includes a first operator member having one end secured to a body or housing and a free end which is movable transversely between two control positions. A second operator member is pivotally mounted on the free end of the first member and includes a control portion which is cooperable with the two control members to perform a control function. The second operator member is resiliently urged about its pivotal connection and toward the control members. The two operator members are so disposed with respect to the control members that, when the free end of the first operator member is moved from a first to a second of its control positions, the control portion of the second operator member operably engages a first of the control members and then pivots thereabout away from the second control member and so that, when the free end of the first operator member is moved from its second position to its first position, the control portion operably engages the second control member and then pivots thereabout away from the first control member. The first operator member has associated therewith a condition responsive means which is effective to cause movement of the free end of the first operator member between its first and second positions. In a preferred arrangement the first operator member is a bimetal having a thermostatically controlled electric heater associated therewith, the second operator member is an ambient temperature compensating bimetal, and the first and second control members are fluid nozzles through which fluid flow is controlled by valve means carried by the second operator member.

Various objects and advantages of my invention will become apparent upon reading the following detailed description of a preferred embodiment thereof wherein reference is made to the accompanying drawing. In the drawing.

Figure 1:
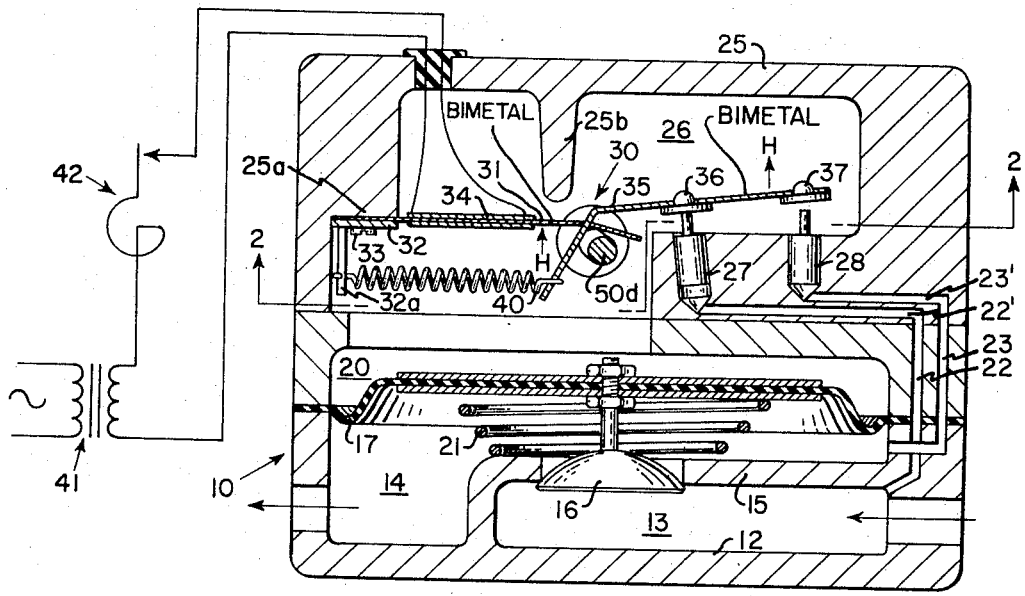
FIGURE 1 is a longitudinal cross-sectional view of a fuel control valve utilizing a preferred embodiment of my invention in a pilot valve or diaphragm controller for a main valve, showing the actuator in a first control position and disclosing schematically a thermostatic control system for the actuator.

Referring to the drawing, FIGURE 1 discloses a fuel control valve which includes a main valve portion 10 and a pilot operator or diaphragm controller portion 11. Main valve portion 10 is conventional and includes a valve body 12 which has an inlet chamber 13 and an outlet chamber 14 separated by an apertured wall 15. Disposed in inlet chamber 13, and cooperable with the aperture in wall 15 to control fluid flow therethrough, is a valve closure member 16. Closure member 16 is carried by a diaphragm 17 which has one side exposed to the pressure in outlet chamber 14 and the other side exposed to the pressure in a control chamber 20 in a body portion 12a. A spring 21 urges the diaphragm to a position wherein closure member 16 is closed. Fluid passages 22 and 23 extend from inlet chamber 13 and from outlet chamber 14, respectively, through body portions 12 and 12a to the diaphragm controller.

Diaphragm controller 11 includes a body 25 mounted on main body portion 12a and secured thereto by appropriate means (not shown). Formed in body 25 is a chamber 26 which is in fluid communication with the control chamber 20 of the main valve. Mounted in body member 25 and extending into chamber 26 are a pair of spaced control members taking the form of fluid nozzles 27 and 28 which are connected to the inlet and outlet chambers of the main valve, respectively, by passages 22' and 23' in body member 25. It will be seen that passages 22' and 23' are extensions of passages 22 and 23, respectively.

Figure 3:
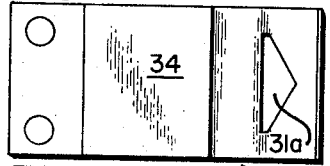
FIGURE 3 is a bottom view of an element of the actuator, referred to herein as "the first operator member"

Disposed in chamber 26 for cooperation with nozzles 27 and 28 is a condition responsive actuator 30. Actuator 30 includes a first operator member 31 which has a fixed end attached to an internal step 25a in body portion 25, on the opposite side of chamber 26 from nozzles 27 and 28, by appropriate means such as a bracket 32 and screws 33. In the preferred form, operator member 31 is an elongated bimetal member as shown in plan view in FIGURE 3. Member 31 has a free end which is movable transversely to the plane of the member and, slightly inward from this end, the member has a triangular opening 31a formed therein with one side extending substantially perpendicular to the axis of the member. The free end may be bent downward slightly with the bend substantially along the previously mentioned one side of the triangle. Disposed in good heat transfer relationship with operator member 31, as by being wrapped around member 31, is an electric heater 34 which, when energized, provides heat to cause the free end of member 31 to warp upwardly from a first control position, which it assumes when the heater is de-energized, to a second control position which is determined by the heat output of heater 34 or more preferably, by the abutment of the free end of member 31 with a downwardly extending abutment portion 25b of body member 25.

Figure 4:
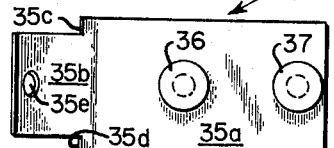
FIGURE 4 is a bottom view of an element of the apparatus, referred to herein as "the second operator number"

Pivoted on the free end of operator member 31 is a second operator member 35 which is shown in plan view in FIGURE 4. Member 35 has a main portion 35a and a downwardly bent portion 35b, the major part of which is formed with a reduced width so as to provide a pair of abutment shoulders 35c and 35d at the end of main portion 35a. The reduced width portion is just wide enough to fit into the triangular opening 31a in first operator member 31. Member 35 is pivotally mounted on the free end of member 31 by having the reduced width portion extending through the triangular opening with shoulders 35c and 35d abutting the upper surface of member 31 adjacent the end to the triangular opening. A pair of spaced openings in member 35 receive and hold a pair of resilient valve closure members 36 and 37 which are cooperable with nozzles 27 and 28, respectively. Preferably these two valve closure members are of a relatively soft resilient material such as rubber to provide a good fluid tight seal when they engage the ends of the nozzles. The portion of member 35 which carries closure members 36 and 37 may be referred to as the control portion of the second operator member. Downwardly struck portion 35b of member 35 has an opening 35e formed therein into which is hooked one end of a biasing spring 40, which has its other end connected around a downwardly extending post 32a of bracket 32. Spring 40 is in tension and tends to rotate operator member 35 about its pivotal mounting on operator member 31 and thus tends to move the control portion of member 35 towards the two control members 27 and 28. While it is not essential to the operation of the actuator, in its preferred form, second operator member 35 is also formed of a bimetallic material and is arranged so that an increase in ambient temperature will cause the control portion thereof to warp upwardly (as seen in FIGURE 1) with respect to the portion that pivots on member 31. At the same time portion 35b warps toward post 32a to gradually reduce the spring tension as ambient temperature increases.

FIGURE 1 also discloses schematically a thermostatically operated control circuit for heater 34. This circuit includes a power supply means 41 represented as a step down transformer, and a thermostat 42 connected in series with heater 34 by appropriate electrical conductors. FIGURE 1 discloses the system in a satisfied condition wherein thermostat 42 has its contacts open so that the heater is de-energized. In this position the free end of operator member 31 assumes its first control position, that is with the free end in its lowermost position. In this position the pivot point of member 32 is also at its lowest position and valve closure member 36 sealingly engages the upper end of nozzle 27. It will be noted here that nozzle 27 is not mounted vertically in chamber 26 but rather forms an acute angle with the vertical so that it is substantially perpendicular to the face of closure member 36 in the first control position of the actuator to assure a good seal.

Figure 5:
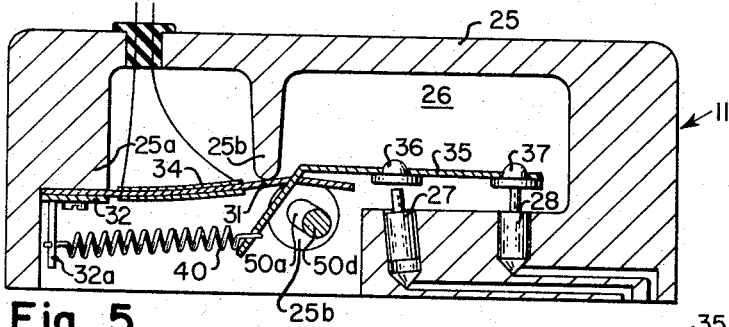
FIGURE 5 is a longitudinal cross-sectional view of the actuator, generally similar to that disclosed in FIGURE 1 but showing the actuator in a second control position.

When heater 34 is energized the free end of operator member 31 moves upwardly to a position where it engages abutment 25b. At this position, which is shown in FIGURE 5, the pivoted end of operator member 35 has moved upwardly and spring 40 has caused member 35 to pivot about its pivotal connection to member 31. Actuator members 31 and 35, as well as control members 27 and 28, are arranged so that when heater 34 is energized and the free end of member 31 begins to move upwardly, member 35 begins to pivot thereabout and also about nozzle 27 and moves valve closure member 37 into operative engagement with the end of nozzle 28 before valve closure member 36 is removed from the end of nozzle 27. It will be noted that nozzle 28 is substantially vertical so as to be substantially perpendicular to the face of valve closure member 37 when the actuator assumes its second control position as shown in FIGURE 5. After closure member 37 has engaged the end of nozzle 28, further movement of the free end of member 31 upward then causes member 35 to pivot about nozzle 28 and lifts valve closure member 36 from the end of nozzle 27. When thermostat 42 is again satisfied and opens its contacts to de-energize heater 34, bimetal 31 begins to move back from its second control position toward its first control position. As it begins to move, valve closure member 37 remains in operative engagement with the end of nozzle 28 and pivots thereabout until the pivotal connection between the two operator members has moved downward sufficiently to cause valve closure member 36 to operatively engage the end of nozzle 27 and to prevent fluid flow therethrough. Thereafter, further movement of the pivotal connection between the two members downwardly results in pivotal movement of member 35 about member 31 and about nozzle 27 and movement of valve closure member 37 away from nozzle 28 and finally to the position disclosed in FIGURE 1.

It will be appreciated that with the apparatus in the position disclosed in FIGURE 1, that is with nozzle 28 in direct communication with chamber 26 and control chamber 20, the area above diaphragm 17 is at substantially the same pressure as outlet chamber 14 immediately below it. Thus, spring 21 moves the main closure member 16 to its closed position. When actuator 30 of diaphragm controller 11 is operated so that the actuator moves to its second control position, as shown in FIGURE 5, communication between outlet chamber 14 and control chamber 20 is interrupted by the co-action of closure member 37 and nozzle 28 but inlet chamber 13 is connected to chambers 26 and control chamber 20 through nozzle 27. Thus, a substantially greater pressure will exist above diaphragm 17 than below it and spring 21 will be overcome so that the closure member 16 is moved to its open position.

Figure 6:
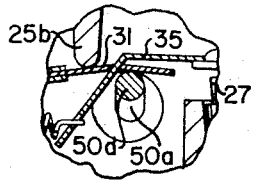
FIGURE 6 is a fragmentary cross-sectional view disclosing a portion of the actuator that is moved from the first to the second control position by a manual operator which forms a part of the invention.
Figure 2:
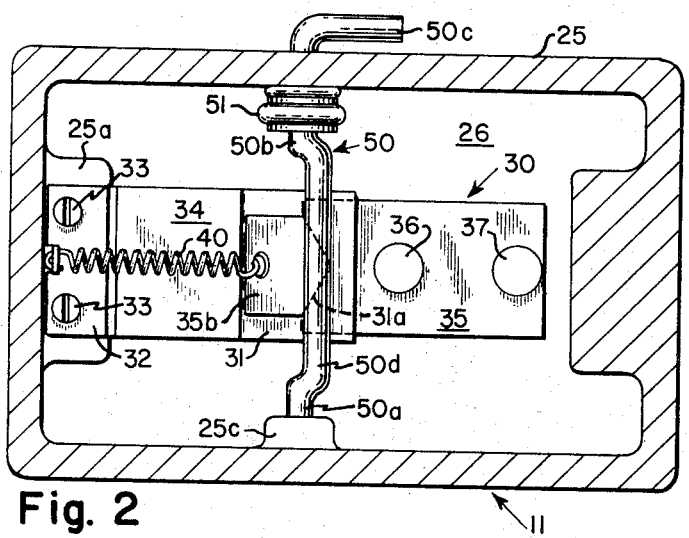
FIGURE 2 is a cross-sectional view taken generally along line 2—2 of FIGURE 1.

In case of an interruption of electrical power, it may be desirable to operate the diaphragm controller manually. For this purpose a manual operator is provided. This includes a shaft 50 having one end 50a journaled in a portion 25c of the wall of housing portion 25 and an aligned portion 50b extending sealing and rotatably through the opposite side of housing 25. This rotatable seal may be obtained by appropriate means indicated by numeral 51. Outside of body 25, member 50 is provided with a handle portion 50c which may be grasped for manual rotation. Intermediate aligned portions 50a and 50b is an offset or eccentric portion 50d which is disposed under the free end of operator member 31. Under normal conditions, as shown in FIGURES 1, 2 and 5, this portion of the manual operator does not interfere with the movement of operator member 31 between its two control positions. However, when it is desired to operate the valve manually, manual operator 50 is rotated to the position disclosed in FIGURE 6 wherein eccentric portion 56 engages the free end of member 31 and lifts it upwardly to its second control position. As member 31 is moved upwardly, closure member 37 first engages the end of nozzle 28 and then closure member 36 is moved away from the end of nozzle 27. It will be understood that when it is desired to close the main valve, the manual operator may again be rotated to its normal position, allowing actuator 30 to assume the position disclosed in FIGURE 1.

As indicated, member 35 is preferably a bimetal member arranged to provide ambient temperature compensation. Since an increase in ambient temperature tends to warp the free end of member 31 upwardly, and thus cause member 35 to pivot in a clockwise direction, member 35 is arranged so that an increase in ambient temperature also causes its free end (control portion) to move upwardly to counteract the effect of the movement by member 31. An increase in ambient temperature also causes portion 35b to warp upwardly and toward post 32a, thus relieving the tension on spring 40. This reduces the spring force tending to rotate member 35 and also reduces the seating force between closure members 36 and 37 and the nozzles. Thus, the greatest seating force is applied at lower ambient temperatures when the closure members may be less flexible and harder to seal and, at higher temperatures where the closure members are more flexible and provide a better seal and where excess seating force might damage the closure members, this force is automatically reduced.

While I have disclosed my invention in combination with a diaphragm operated valve, it will be appreciated that the novel actuator may also be applied to other types of control devices. For example, rather than the closure members 36 and 37 cooperating with nozzles 27 and 28, the actuator can be used for operating switch contacts. It will also be appreciated that it is not essential that second operator member 35 can be an ambient temperature compensating bimetal. If ambient compensation is not required, the member may be formed of some other appropriate material. It will further be appreciated that it is not essential that first operator member 31 be formed of a bimetal and be pivoted in response to the energization of a heater such as heater 34. It is essential that the member have one end fixed and the other movable in response to some type of condition responsive device. This may, for example, be a direct acting thermostatic expansion and contraction type of actuating device in cooperation with a pivoted member. The structure disclosed and described is a preferred embodiment and is disclosed by way of example rather than by way of limitation. Since various modifications may be apparent to those skilled in the art in view of my disclosure herein, it is intended that my invention be limited solely by the scope of the appended claims.

I claim:

1. Condition responsive control apparatus comprising: a body; first and second control members spaced from each other on said body; a first operator member having a fixed end secured to said body and a free end transversely movable between first and second control positions; a second operator member pivotally mounted on the free end of said first operator member and including a control portion disposed in close proximity with said first and second control members and cooperable therewith to perform a control function; means resiliently urging said second operator member about its pivotal connection and thereby urging said control portion into operative engagement with said control members, said operator members being disposed with respect to said control members so that, when the free end of said first operator member is moved from its first to its second position, the control portion of said second operator member operably engages said first control member and then pivots thereabout away from said second control member and so that, when said free end is moved from its second position to its first position, said control portion operably engages said second control member and then pivots thereabout away from said first control member; and condition responsive means operably associated with said first operator member to effect movement of said free end between said first and second positions.

2. The apparatus of claim 1 wherein said control members are a pair of fluid nozzles; wherein said first operator member is a temperature responsive actuating bimetal; wherein said condition responsive means includes a heater in heat transfer relationship with said actuating bimetal and means for operating said heater in response to predetermined conditions; wherein said second operator member is a temperature responsive bimetal arranged to compensate for the effect of ambient temperature change upon the position of said control portion of said second operator member; and wherein said control portion cooperates with said nozzles to control fluid flow therethrough.

3. The apparatus of claim 2 wherein said two nozzles lie in a single plane and are inclined so that their axes form an acute angle with each other; wherein said control portion is substantially normal to and in engagement with the first of said nozzles and is spaced from said second nozzle when the free end of said actuating bimetal is in its second position, and is substantially normal to and in engagement with the second of said nozzles and spaced from said first nozzle when said free end is in its first position; and wherein the bimetal operating members and the nozzles are arranged so that upon movement of the free end of said actuating bimetal from one of its positions to the other, said control portion first pivots about the nozzle which is engaged in said one position and maintains that nozzle closed until it engages and closes the other nozzle, after which it pivots about said other nozzle and opens the nozzle which was closed in said one position.

4. The apparatus of claim 1 wherein the apparatus includes temperature responsive means for varying the force applied to said second operator member by said means resiliently urging said second member about its pivotal mounting, and wherein said temperature responsive means is constructed and arranged so that said force is increased in response to decreasing ambient temperature and is decreased in response to increasing ambient temperature.

5. The apparatus of claim 1 wherein the free end of said first operator member is subject to displacement due to changes in ambient temperature and wherein said second operator member is a temperature responsive compensating member arranged to deflect in response to ambient temperature change to substantially nullify the effect of such displacement on the position of the control portion of said second operator member.

6. The apparatus of claim 5 wherein the means resiliently urging said second operator member about its pivotal connection is a spring having one end operably connected to the body and the other end operably connected to said second operator member and wherein said second operator member deflects in response to an increase in ambient temperatures to lessen the distortion of said spring to reduce the force exerted thereby on said second operator member.

7. The apparatus of claim 5 wherein said first operator member is a temperature responsive actuating bimetal and said condition responsive means includes a heater for said actuating bimetal and operable to cause the free end of said bimetal to move from said first to said second position.

8. The apparatus of claim 7 wherein said body is constructed of material having relatively high thermal conductivity and wherein said body includes a stop portion so disposed that it is engaged by said first operator member when in its second position so that heat is dissipated from said first operator member through sad body.

9. The apparatus of claim 7 wherein said compensating member is a temperature responsive bimetal.

10. The apparatus of claim 9 wherein said control members are a pair of fluid nozzles and the cooperating control portion on said second operator member includes valve closure means cooperable with said nozzles to control fluid flow therethrough.

References Cited

UNITED STATES PATENTS

| | | | |
|---|---|---|---|
| 2,398,452 | 4/1946 | Shaw | 137—596.17 X |
| 2,461,615 | 2/1949 | Taylor | 251—11 X |
| 3,080,143 | 3/1963 | Biermann | 251—11 |
| 3,263,693 | 8/1966 | Ages | 251—30 X |

M. CARY NELSON, *Primary Examiner.*

ARNOLD ROSENTHAL, *Examiner.*